Feb. 9, 1937.  L. RUTHENBURG  2,069,852
VEHICLE
Filed Sept. 17, 1935
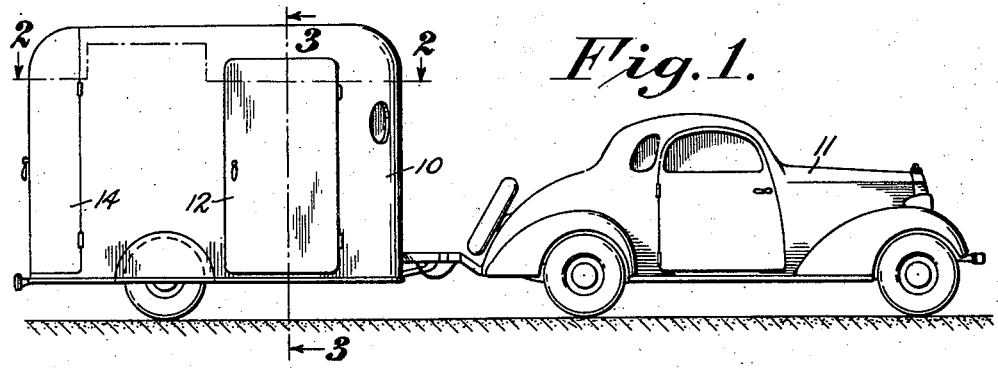
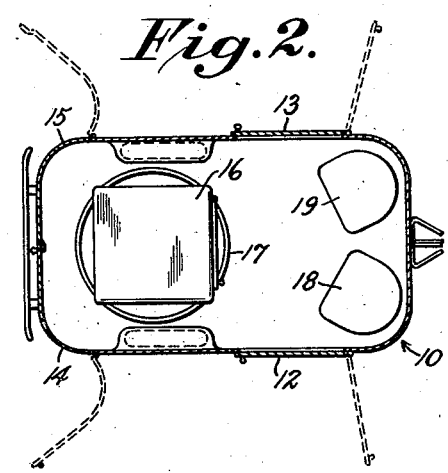
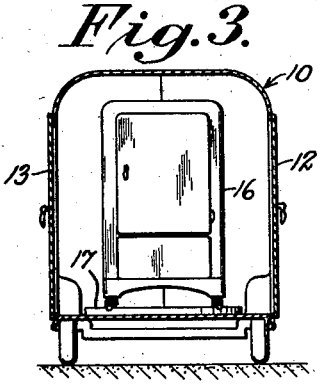
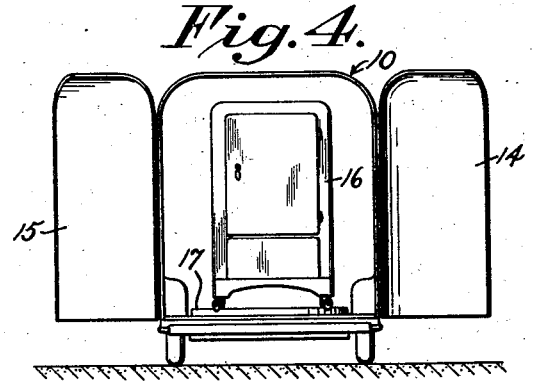
INVENTOR.
Louis Ruthenburg
BY
his ATTORNEY.

Patented Feb. 9, 1937

2,069,852

UNITED STATES PATENT OFFICE 2,069,852

VEHICLE

Louis Ruthenburg, Evansville, Ind., assignor to Servel, Inc., New York, N. Y., a corporation of Delaware Application September 17, 1935, Serial No. 40,889

2 Claims. (Cl. 296—21)

My invention relates to vehicles and more particularly to a trailer for sales promotion purposes and it is an object of the invention to provide a vehicle which is adapted both for private display and demonstration of merchandise within the vehicle and public display of the merchandise outside of the vehicle.

My invention, together with the objects and advantages thereof, will fully appear upon consideration of the following description taken in connection with the accompanying drawing forming part of this specification and of which:

Fig. 1 is a side elevation of an automobile and trailer embodying my invention;

Fig. 2 is a sectional view taken on line 2—2 in Fig. 1;

Fig. 3 is a sectional view taken on line 3—3 in Fig. 1; and

Fig. 4 is a rear view of the trailer shown in Fig. 1 with the rear doors open.

Referring to Fig. 1 of the drawing, there is shown a trailer 10 operatively connected to be drawn by an automobile 11. The interior arrangement of the trailer 10 may be more clearly understood by reference also to Figs. 2, 3, and 4. On opposite sides of the trailer 10 and toward the forward end thereof are doors 12 and 13. The rear end of the trailer is formed by a pair of doors 14 and 15. Merchandise to be demonstrated is suitably arranged in the rear portion of the trailer in such a manner that it may be viewed by occupants of the forward part of the trailer and also displayed to persons outside of the trailer when the rear doors 14 and 15 are swung open. In the present embodiment of my invention, the merchandise to be demonstrated is a refrigerator 16 arranged to be rotated, for instance, by mounting on a suitable turntable 17. As illustrated in Figs. 2 and 3 the refrigerator 16 faces the forward part of the trailer 10 so that it may be demonstrated to and viewed by occupants of the trailer who may be seated in chairs 18 and 19. It will be understood that the trailer 10 may be provided with suitable lighting arrangements, not shown, for effectively illuminating the refrigerator 16 on display.

It will now be understood how the trailer 10 may be used to either demonstrate the refrigerator 16 to a few persons or display the refrigerator to a large gathering. In the first case, the rear doors 14 and 15 are kept closed and the refrigerator is faced toward the forward part of the trailer so that it may be viewed by one person or a small group of persons inside of the trailer. Where the number of persons desiring to see the refrigerator 16 is relatively small, they may enter one side door 12 singly or in small groups and leave by the other side door 13. However, when the number of persons desiring to see the refrigerator 16 is so great as to cause delay or confusion if they were to enter the trailer, the rear doors 14 and 15 may be thrown open, as illustrated in Fig. 4, and the refrigerator 16 turned about so that it faces to the rear of the trailer and may be viewed by a large assembly. This trailer may thus be used at one time for private demonstration to, for instance, a prospective dealer, and at another time for display to large assemblies, as at fairs and the like.

Various changes may be made within the scope of my invention as set forth in the following claims.

What is claimed is:

1. A dual utility trailer for the public display of merchandise or as a private office and comprising a body, wheels supporting said trailer rearwardly of its center, said body having side and rear doors, the side doors being forward of and the rear doors, the side doors being forward of the wheels and the rear doors forming a part of the sides of the body, a turntable mounted in said body in substantially the same longitudinal position as said wheels whereby weight on the turntable will be borne directly by said wheels, the construction and arrangement of parts providing private space for persons adjacent the turntable in the front of the body and affording clear vision into the body through the side and rear doors for public display.

2. A dual utility trailer constructed for the display of merchandise from both the interior and the exterior of the same and comprising a body, a movable display stand for merchandise to be displayed located within said body and mounted to provide a customer compartment within the body, said body having doors at its sides and rear respectively for affording access into the vehicle and for permitting unobstructed vision into the rear of the vehicle, and wheels supporting said body in substantially the same longitudinal position as said movable display stand for bearing the weight of the merchandise displayed substantially directly upon the wheels.

LOUIS RUTHENBURG.